United States Patent [19]

Chalpin

[11] Patent Number: 5,402,666

[45] Date of Patent: Apr. 4, 1995

[54] METHOD AND APPARATUS FOR PRECISE MEASUREMENT OF DIFFERENTIAL PRESSURES

[75] Inventor: Blair R. Chalpin, San Diego, Calif.

[73] Assignee: Scanivalve Corporation, San Diego, Calif.

[21] Appl. No.: 280,780

[22] Filed: Jul. 26, 1994

[51] Int. Cl.$^6$ .............................................. G01L 27/00
[52] U.S. Cl. ...................................................... 73/4 R
[58] Field of Search .......................... 73/4 R, 4 D, 4 V

[56] References Cited

U.S. PATENT DOCUMENTS

| 3,262,305 | 7/1966 | Dawley | 73/4 R |
| 4,909,063 | 3/1990 | Olsen | 73/4 R |
| 4,926,674 | 5/1990 | Fossum et al. | 73/4 R |

OTHER PUBLICATIONS

Brock, "Centralized in Place Pressure Calibration System for Multiple Turbine Engine Aerodynamic Pressure Measurement Systems", Conference: Instrumentation in the Aerospace Industry vol. 26 Advances in Test Measurement, vol. 17, Proceedings of the 26th Interenational Instrumentation Symposium Seattle, Wash., USA. (5–8 May 1980).

*Primary Examiner*—Robert Raevis
*Attorney, Agent, or Firm*—J. F. McLellan

[57] ABSTRACT

A method and apparatus for precise measurement of low differential pressures existing between known high reference pressures and high test pressures. One or more scanner modules are used, each module enabling a reference pressure to be applied to a set of differential pressure sensors located in the module. Adding a second module allows a different reference pressure to be applied to a second set of sensors located in the second module, and using additional modules allows additional reference pressures to be applied to more sets of sensors. Each module enables the application of known calibration pressures to the sensors incorporated in the module. The present method and apparatus are more economical and less complex compared to prior art systems in which manifolds and associated valving are not integral with the modules but are located in separate patch panels and have to be connected to each sensor module by a multiplicity of pneumatic jumper lines.

12 Claims, 5 Drawing Sheets

METHOD AND APPARATUS FOR PRECISE MEASUREMENT OF DIFFERENTIAL PRESSURES

BACKGROUND OF THE INVENTION

1. Field of the Invention

The invention relates to a method and apparatus for precisely measuring a range of relatively low differential pressures existing between known, relatively high pressure sources. One or more scanner modules are utilized, each incorporating a plurality of differential pressure sensors, and each adapted to house ports and valving for internally coupling the pressure sources to each of the sensors.

2. Description of the Prior Art

It is known to measure differential pressures by employing a so-called patch panel having a single reference port and a pair of calibration ports.

The reference port in the patch panel is adapted to be coupled to a known reference pressure. The port is selectively coupled to a manifold in the patch panel through suitable valving in the patch panel. Likewise, the calibration ports in the patch panel are adapted to be coupled to known calibration pressures for coupling to the manifold.

The manifold enables application of reference and calibration pressures to sensor outlets that are located in the patch panel. The sensor outlets are connectible to differential pressure sensors in one or more separate scanner modules. Any sensor outlets in the patch panel in excess of the number of sensors in the scanner modules must be temporarily plugged.

This type of system is sometimes referred to as a high line, low differential pressure measurement and calibration system. High line pressures are involved, but it is the dynamic measurement of the relatively low pressure differences existing between the high line pressures which is of interest.

For example, in the design of gas turbines, it is important to measure and compare the pressure differentials which exist across the compressor stages of the turbines. Although it is possible to use a pair of very high accuracy pressure sensors, and measure the absolute pressures present at each of the adjacent turbine stages to determine the pressure difference, this technique does not produce accurate results.

More particularly, if the high pressures at the two stages are in the range of 100 pounds per square inch (psi), and if a pair of high accuracy sensors are selected having a full scale deflection of perhaps 100 psi, these sensors might, for example, yield readings of 90 and 95 psi, respectively. The differential pressure of 5 psi would represent only a small part of the full scale deflection of the sensors. Detecting and precisely measuring such relatively small differential pressures is difficult where the sensor is being deflected over a relatively wide range by relatively high line pressures.

Use of the present system of high line low differential pressure measurement does away with the need for relatively expensive sensors to accurately measure the high line pressures at adjacent turbine stages. Instead, a number of relatively inexpensive differential pressure sensors are selected which have a full scale deflection approximating the maximum differential pressure expected, thus achieving the accuracy which full scale deflection affords. These measure the differences between, for example, a known, measured high line pressure taken off one turbine stage, and a number of unknown high line pressures taken off points adjacent the turbine stage.

A differential pressure sensor which is preferred for this purpose is one which employs a piezoresistive sensor component. As is well known to those skilled in the art, such a component is typically used in circuit with a suitable control means, and is responsive to applied pressure to modulate a control signal applied to it by the control means. The magnitude and polarity of the signal changes according to the magnitude of the applied pressure, and according to the side of the component to which the pressure is applied.

The high pressure reference pressure is tapped off from one turbine stage and is precisely measured by independent means so that it is known. This known high pressure is then applied to the so-called negative side of the piezoresistive component. When the unknown or test pressure, which is also a high pressure, is applied to the opposite or positive side of the component, the sensor will provide a differential pressure.

However, the piezoresistive sensor described is characterized by differences in the configuration and volume of the spaces adjacent the positive and negative sides of the sensor component. Consequently, when equal high line pressures are applied to the opposite sides of the sensor, an "off-zero" indication results. Therefore, a line zero calibration of the sensor must be performed in order to have the sensor provide a zero indication upon the application of such equal pressures. Calibration procedures well known in the art involve the application of a range of positive pressures to one side of each of the sensor components, followed by establishment of zero (ambient) pressure at both sides, and next followed by the application of negative pressures to the other sides of the components. The term "zero" as used herein is intended to mean ambient pressure.

This allows development of a set of calibration coefficients which can be incorporated in suitable computer software programs to compensate for off-zero indications that occur when equal pressures are applied to the opposite sides of sensor components. Such calibration coefficients effectively establish a zero pressure differential whenever the same high line reference pressure is applied to both sides of a sensor. Then, under test conditions, application of a high line reference pressure and an equal test pressure, respectively, to the opposite sides of a sensor will yield a zero differential pressure reading.

As will be seen, such a calibration is a dynamic process which is done during the running of the turbine tests. This factors in any changes which may occur in the turbine stage reference pressure so that the accuracy of the differential pressure readings is relatively constant.

The foregoing system works satisfactorily for applications such as turbine testing which involve a large number of sensors, but it lacks operational flexibility where lesser numbers of sensors are involved, and where different ranges of reference and calibration pressures are to be used.

In the turbine testing system, only a single high reference pressure can be applied to a patch panel through its reference port for application to the sensors in a separate scanner module or modules. Another patch panel must be used if a different high reference pressure is to be applied to the sensors in the associated scanner modules.

Likewise, only one level of calibration pressure can be applied to a patch panel through its calibration ports for application to the opposite sides of the sensors in the separate scanner modules. If use of another calibration pressure is necessary for a further set of sensors, a second patch panel must be used to enable application of the different calibration pressure to the opposite sides of the sensors in the additional scanner module or modules. In other words, the number of reference and calibration pressure sources that can be used is restricted to the number of patch panels that are used.

It would be desirable in test systems using several scanner modules to enable application of different reference and calibration pressures to the sensors of separate scanner modules, respectively, without any need for patch panels and the multiplicity of pneumatic lines that connect them to such patch panels.

SUMMARY OF THE INVENTION

According to the present invention, a high-line, low differential pressure testing and calibration method and apparatus are provided which are adapted to precisely measure the low differential pressures existing between a known high pressure reference source and each of a plurality of unknown high pressure test sources. The apparatus and method are characterized by a control means and one or more scanner modules into which are integrated a plurality of differential pressure sensors, a reference source port, and positive and negative calibration ports.

Each sensor preferably includes a piezoresistive component which is in electrical circuit with the control means, and which is responsive to applied pressure to modulate an electrical signal applied to it by the control means.

The sensor components are calibrated by selective connection of the opposite sides of the components with the reference and calibration ports in the associated scanner module.

Since each scanner module has its own high pressure reference port, a number of reference pressures can be applied to each module. Further, calibration pressures of the same magnitude can be applied to the calibration ports of all of the scanner modules.

The apparatus and method significantly reduce the complexity and expense of employing scanner modules with a multiplicity of reference pressures.

Other aspects and advantages of the present invention will become apparent from the following more detailed description taken in conjunction with the accompanying drawings.

DESCRIPTION OF THE PREFERRED EMBODIMENTS

Prior Art System

Figure 1:
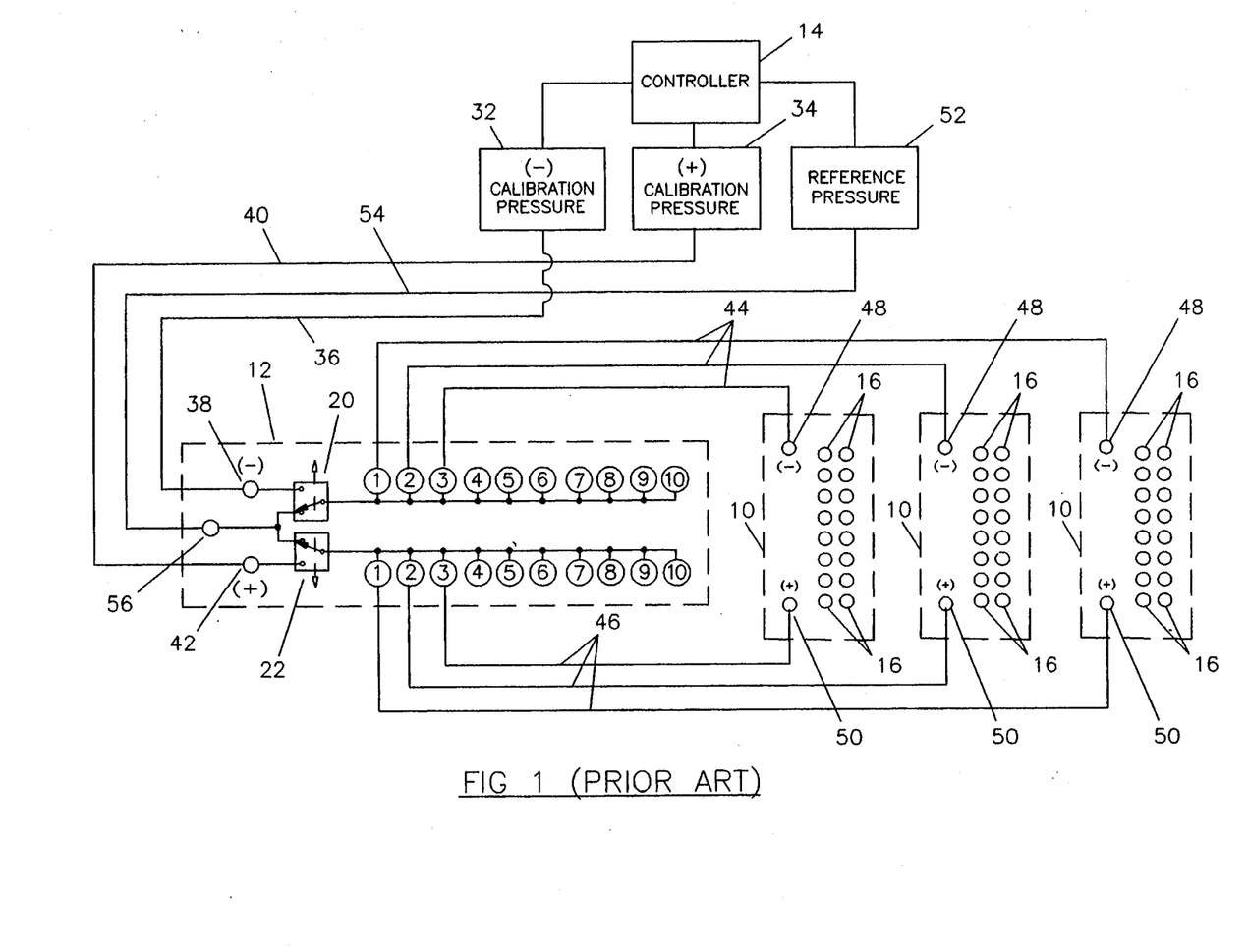
FIG. 1 is a partially diagrammatic view of a prior art system employing a patch panel and a plurality of associated scanner modules.
Figure 2:
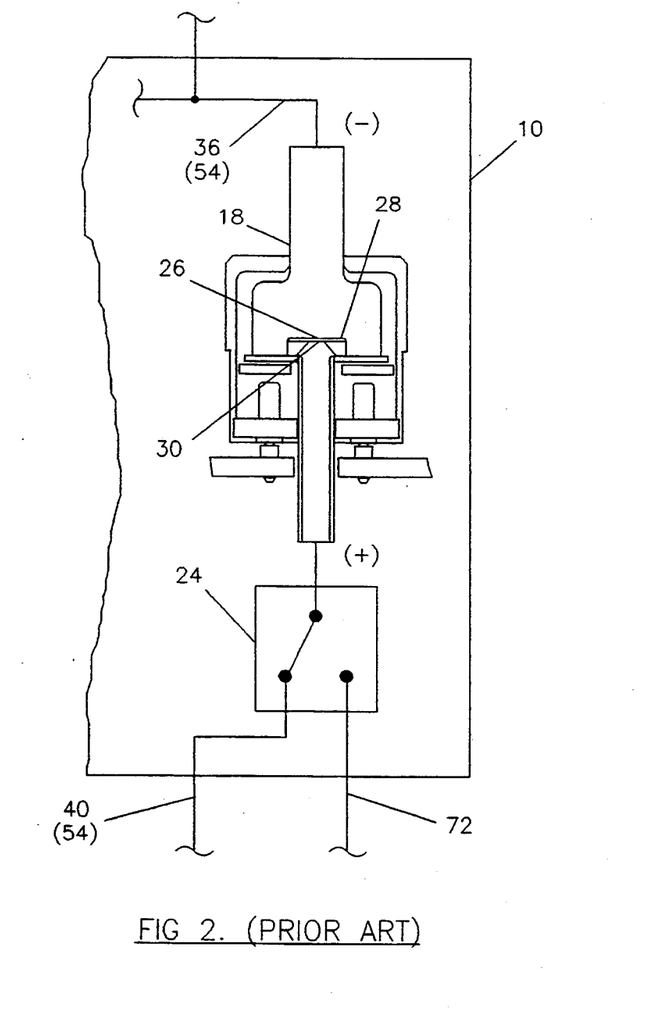
FIG. 2 is a partially diagrammatic view of a portion of one of the scanner modules of the prior art system of FIG. 1.

Referring now to the drawings, and particularly to FIGS. 1 and 2, a prior art system is illustrated which is effective to precisely measure low differential pressures existing between a known high pressure source and each of a plurality of unknown high pressure test sources.

The prior art system comprises, generally, a plurality of scanner modules 10 coupled to a patch panel 12 which accepts various pressure inputs and enables their application to the scanner modules 10. The power input from a controller 14, and the multiplexed signal output from the modules 10 are only schematically indicated by connecting lines which also represent pneumatic line connections, as will be seen.

Three scanner modules are illustrated, but in an actual turbine testing system eight such modules are carried within a single enclosure (not shown), and each module includes test pressure ports 16 for accepting 16 unknown test pressure inputs. These inputs comprise pneumatic jumper lines (not shown) which have open ends located at the stages of the turbine whose pressures are of interest. Many different stages can be tested at one time. A selected number of stages are used to provide high pressure references, one of which is illustrated at 52.

In the sophisticated prior art measurement system of FIGS. 1 and 2, over a thousand pressure pickup points are interconnected by pneumatic and electrical signal lines. For brevity, only one patch panel 12 and associated patch panel valves 20 and 22, and three scanner modules 10, are shown in FIG. 1, and one pressure differential sensor 18 and its associated scanner valve 24 are shown in FIG. 2.

This prior art system uses semiconductor pressure differential sensors 18 which each incorporate a strain gage bridge diffused into a single piezoresistive sensor crystal (monocrystalline) silicon diaphragm or component 26 that is temperature compensated and responsive to applied pressure to modulate a constant current excitation source or electrical signal applied to it by the controller 14. Typically, the component 26 will be less than 0.001 inches thick for a differential range of 2.5 psi.

The magnitude of the signal changes according to the magnitude of the applied pressure, and its polarity changes according to the direction of the applied pressure, that is, whether the pressure is applied to the reference or negative side 28 or the test or positive side 30 of the sensor component 18, as seen in FIG. 2.

In addition, the configuration and volumes of the sensor 18 on opposite sides of the sensor component 26 differ. As seen in FIG. 2, the sensor cavity for the application of negative pressure is larger than the sensor cavity for the application of positive pressure. Consequently, application of equal high line pressures to the negative and positive sides 28 and 30 will not result in a "zero" indication. The zero shift appears primarily at the high line zero differential point. A high line zero calibration at this elevated condition corrects the zero shift, and further application of varying differential pressures show only slight span errors. Each sensor must therefore be calibrated, the procedures for doing this being well known to those skilled in the art.

More particularly, in a sensor calibration mode, and under the control of the controller 14, preferably three positive calibration pressures from a calibration pressure source 32 are applied one after the other to the positive side 30 of the sensor component 26, the pressures being low, mid, and high scale pressures within the differential pressure range of interest, followed by establishment of zero (ambient) pressure. Three positive calibration pressures including zero (ambient) are next applied to the positive side 30 of the sensor component 26 from a calibration pressure source 34. Like the reference pressure 52, these pressures are precisely measured by apparatus (not shown) forming part of or associated with the controller 14. The pressures are tapped off stages of the turbine which are close to the pressures of interest, and are stabilized at the desired pressure level by suitable servo mechanisms (not shown).

These stabilized calibration pressures are applied to the sensors, the resulting electrical signals are received by the controller 14, and calibration coefficients are calculated and stored in "look-up" tables under the control of computer software, as is well known to those skilled in the art. The coefficients are used by the controller to correct for non-linearity, zero offset, and pressure sensitivity in the sensor components whereby zero readings can be derived upon application of various sets of equal pressures to the opposite sides of the sensor components.

The various modes of operation of the prior art apparatus is seen in FIG. 1. Negative calibration pressures from the calibration source 32 are applied through a pneumatic line 36 to a negative patch port 38 in the patch panel 12, which is coupled to the patch panel valve 20.

Similarly, positive calibration pressures from the calibration source 34 are applied through a pneumatic line 40 to a positive patch port 42, which is coupled to the patch panel valve 22.

As will be apparent, the position of the movable elements of the valves 20 and 22 determine the mode of operation of the system. The movable elements operate in unison. Their normal position is closed, as pictured in FIG. 2. Thus, when the elements are open, negative calibration pressures can be applied to all of the upper ten manifold ports shown, while positive calibration pressures can be applied to all of the lower ten manifold ports shown. These manifold ports are connected by pneumatic jumper lines 44 and 46, respectively, to negative calibration ports 48 and positive calibration ports 50 in the scanner modules 10.

When the movable elements of the valves 20 and 22 are returned to their normal positions, pressure from a known high pressure reference source 52 is applied through a line 54 to a reference patch port 56 in the patch panel. The port is coupled through the valves 20 and 22 to both the upper ten and the lower ten of the ports and, through the jumper lines 44 and 46, this reference pressure can be applied to the sensor components 26 (not shown) in conjunction with the application of measurement or test source pressures to the test pressure ports 16.

The prior art system works satisfactorily for applications such as turbine testing which involve a large number of sensors, but it lacks operational flexibility where lesser numbers of sensors are involved, and where different ranges of reference and calibration pressures are to be used.

As previously indicated, only a single high reference pressure can be applied to a patch panel through its reference port for application to the sensors in a separate scanner module or modules. Another patch panel must be used if a different high reference pressure is to be applied to the sensors in the associated scanner modules.

Likewise, only one level of calibration pressure can be applied to a patch panel through its calibration ports for application to sensors in separate scanner modules. If use of another level of calibration pressure is necessary for a further set of sensors, a second patch panel must be used to apply the different calibration pressure to the sensors in the additional scanner module or modules. In other words, the number of reference and calibration pressure sources that can be used is restricted to the number of patch panels that are used.

In the system of the invention, which will next be described, it is possible to apply different reference and calibration pressures to the sensors of separate scanner modules, respectively, without any need for patch panels and the multiplicity of pneumatic lines that connect them to such patch panels. For convenience, components of the invention which are identical to those of the prior art will be assigned identical numerals, and similar components will be assigned the same numeral with an associated "a".

Figure 3:
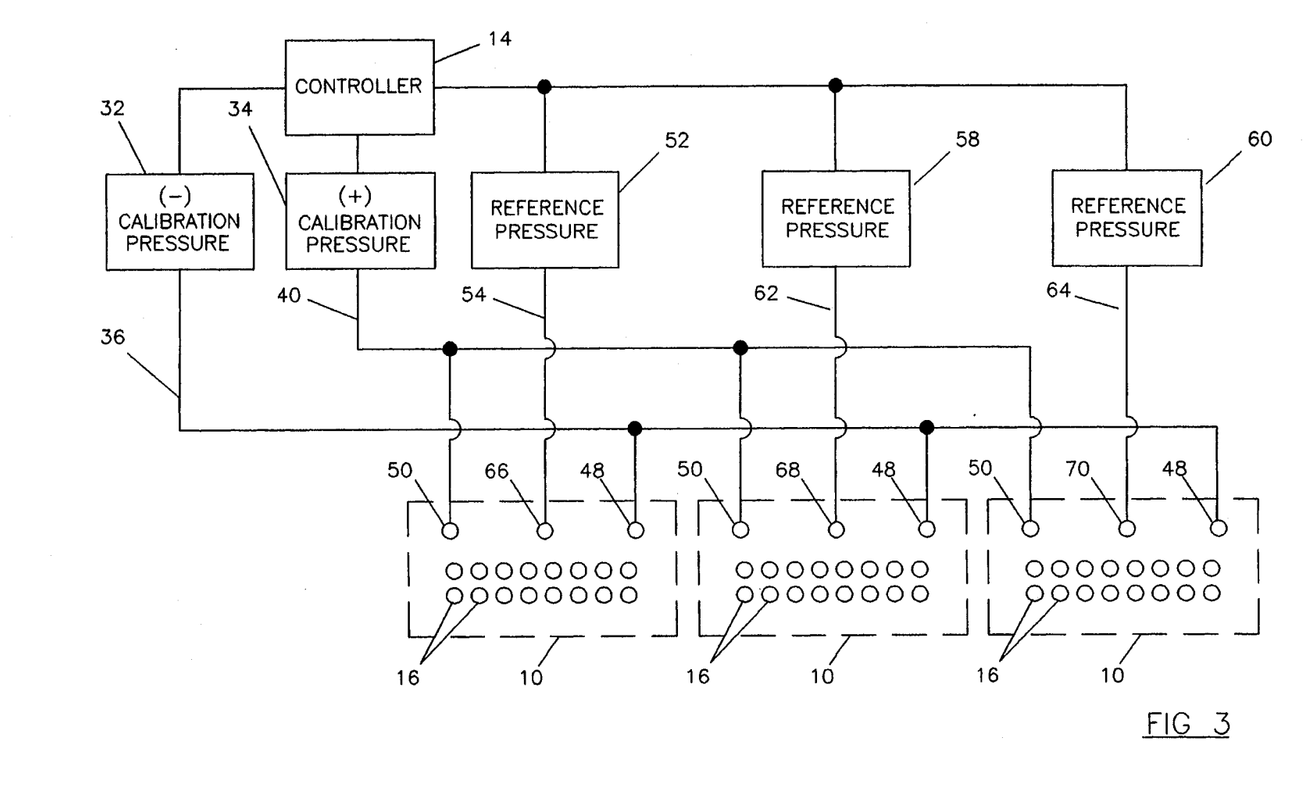
FIG. 3 is a partially diagrammatic view of the present system of the present invention, which employs a plurality of scanner modules connected directly to manifolds carrying calibration pressures, and connected directly to a plurality of sources of reference pressures.

As seen in FIG. 3, the present invention comprises a controller 14 operating to apply pressures to the scanner modules 10 from the calibration pressure sources 32 and 34 and the reference pressure source 52 through the lines 36, 40 and 54, respectively, as before. However, two additional pressure sources 58 and 60 are also able to apply their pressures to the scanner modules through lines 62 and 64. For this purpose the three exemplary scanner modules illustrated are provided with their own scanner high pressure reference ports 66, 68 and 70. Since each scanner module has its own high pressure reference port, a number of reference pressures can be applied to the modules with little difficulty. Likewise, the exterior ganging or manifolding of the calibration pressure lines 36 and 40 allows calibration pressures of the same magnitude to be applied to the calibration ports of all of the scanner modules. This reduces the complexity and expense of employing scanner modules to deal with a multiplicity of reference pressures.

Figure 4:
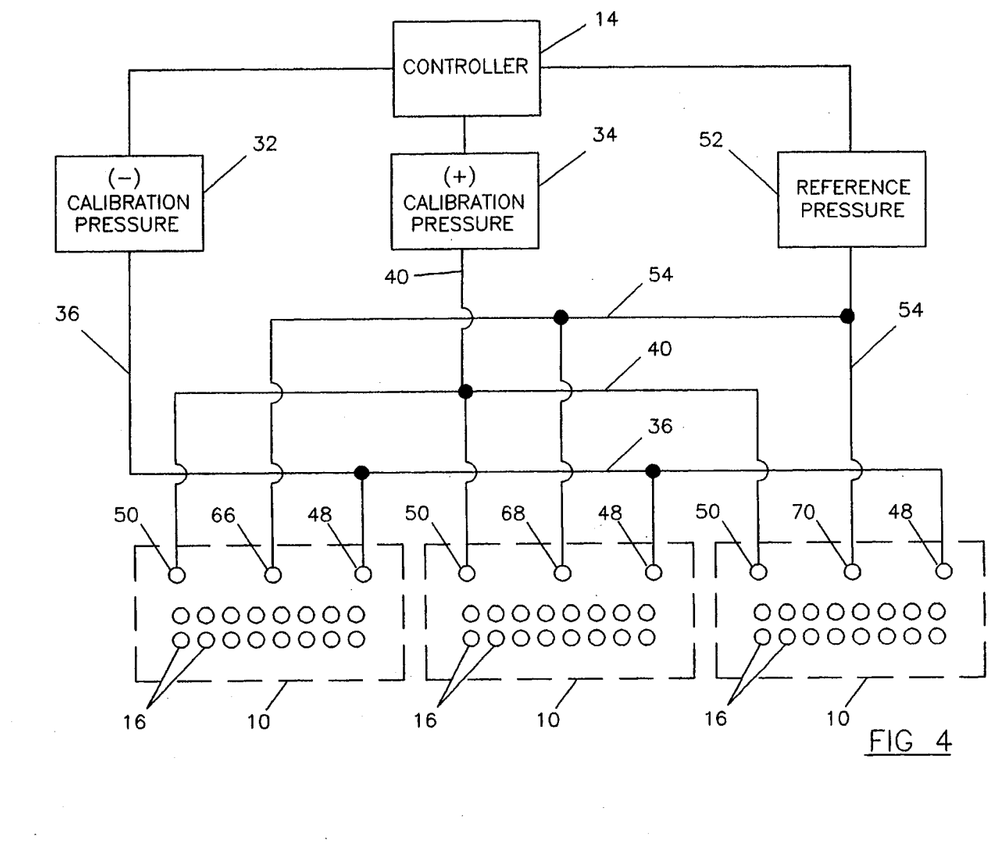
FIG. 4 is a view similar to FIG. 3, but illustrating another embodiment of the system of the present invention, which employs a plurality of scanner modules connected directly to manifolds carrying calibration pressures and a single reference pressure.

FIG. 4 illustrates how the present system can also be used to apply the same calibration and reference pressures to all three manifolds. This is done by externally ganging or manifolding the calibration and reference pressure lines 36, 40 and 54 to that each scanner module can tap off the pressure lines through the branch lines illustrated.

Figure 5:
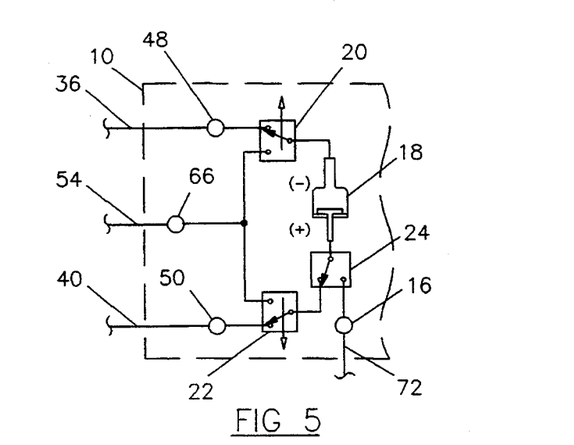
FIG. 5 is a partially diagrammatic view of a portion of one of the scanner modules of FIG. 4, illustrating one of the pressure differential sensors and its associated valving in a sensor calibration mode.
Figure 6:
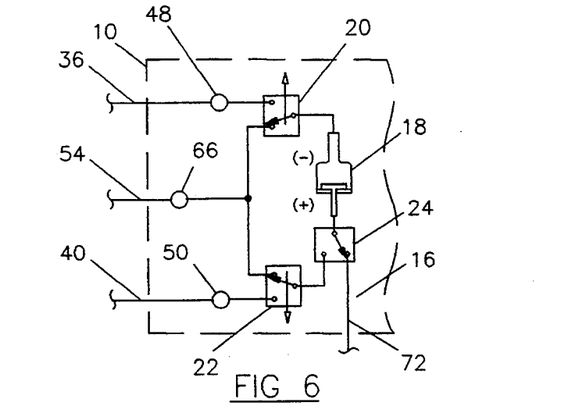
FIG. 6 is a view similar to FIG. 5, but illustrating the sensor and its valving in a read differential mode.
Figure 7:
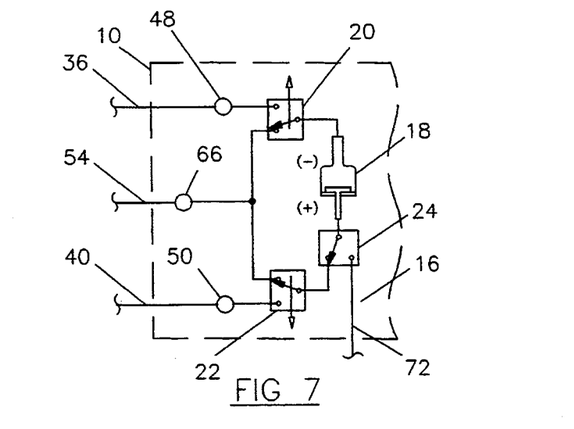
FIG. 7 is a view similar to FIG. 5, but illustrating the sensor and its valving in a line zero calibration mode.

Referring now to FIGS. 5, 6 and 7, and particularly FIG. 5, the valves 20 and 22 which were part of the patch panel in the prior art system are now a part of each of the scanner modules, and operate in conjunction with the scanner valve 24 of FIG. 2 that is located in the scanner module in both the prior art and the present system.

In operation, the present system provides a method for precise measurement of low differential pressures existing between a known pressure reference source 52, for example, and each of a plurality of unknown high pressure test sources (not shown) which are applied to the scanner modules 10 of the system through test pressure ports 16. As just described, a plurality of differential pressure sensors 18, a reference source port 66, and positive and negative calibration ports 50 and 48, respectively, are all integrated in each scanner module 10.

First, as seen in FIG. 5, a sensor calibration mode is established in which successive positive calibration pressures are applied to one side 30 of the sensor components 26, then establishment of zero (ambient) pressure at opposite sides is established, followed by successive application of negative calibration pressures to the other side 28 of each of the components. This is accomplished by the illustrated positions of the valves 20, 22, and 24. From this are derived the set of calibration coefficients previously described.

Next, as seen in FIG. 6, a read differential mode is established by movement of the valve components to the positions illustrated, under the control of the controller 14. This couples one side 28 of the sensor components 26 to the reference source port 66, and the other sides 30 of the components to the test pressure sources, one of the lines leading to one such test pressure source being illustrated at 72.

A line zero calibration mode is then established under the control of the controller 14, in which the valve components are operated to the positions of FIG. 7, in which the other sides 30 of the components 26 are disconnected from the test pressure source 72 and momentarily connected to the high pressure reference source 52. As previously indicated, this enables the controller 14 to update or generate a new set of calibration coefficients for use by the controller 14 for deriving accurate readings upon subsequent recoupling of the pressure sensors 18 to the high pressure test sources.

The last step of the method is of course to recouple the pressure sensors to the high pressure test sources to determine the differential pressures existing between the high pressure reference source 52 and the test pressure source 72.

In this manner there can be achieved precise measurement of low differential pressures existing between known high reference pressures and high test pressures. Each scanner module has its own high pressure reference port so that different reference pressures can be applied to each module, and calibration pressures of the same magnitude can be applied to the calibration ports of all of the associated scanner modules.

Various modifications and changes may be made with regard to the foregoing detailed description without departing from the spirit of the invention, particularly with respect to testing procedures involving applications other than turbine stage testing.

I claim:

1. Method for precise measurement of low differential pressures existing between a known high pressure reference source and each of a plurality of unknown high pressure test sources by using a plurality of differential pressure sensors, a high pressure reference source port, and positive and negative calibration ports that are all integrated in a scanner module, the method comprising:

utilizing pressure sensors which are each characterized by a sensor component in electrical circuit with a control means, the sensor component being responsive to applied pressure to modulate an electrical signal applied to it by the control means, the magnitude and polarity of the signal changing according to the magnitude of the applied pressure and the side of the sensor component to which the pressure is applied, the high pressure reference source port being connected to the known high pressure reference source, and the positive and negative calibration ports being connected to known positive and negative calibration pressure sources, respectively;

establishing a sensor calibration mode by coupling the opposite sides of the sensor components to the positive and negative calibration ports, respectively, to first apply positive calibration pressures to one side of each of the components, then to establish zero (ambient) pressure at both of the sides, and then to apply negative calibration pressures to the opposite side of each of the components over a range of calibration pressures, the control means operating upon the resulting signals from the pressure sensors to generate and store a set of calibration coefficients for use by the control means to correct for non-linearity, zero offset and pressure sensitivity in the pressure sensors whereby zero readings can be derived from the pressure sensors upon application of various sets of equal pressures to the opposite sides of the sensor components;

coupling one side of the sensor components to the high pressure reference source port, and the other sides of the sensor components to the high pressure test sources, respectively;

establishing a line zero calibration mode by momentarily coupling such other sides of the sensor components to the high pressure reference source port to enable the control means to generate a new set of updated calibration coefficients for use by the control means to correct for any zero reading shift upon subsequent recoupling of such other sides of the sensor components to the high pressure test sources, respectively; and recoupling such other sides of the sensor components to the test sources, respectively, for utilization of the updated calibration coefficients by the control means to determine the actual differential pressures existing between the high pressure reference source and the high pressure test sources.

2. Method according to claim 1 wherein a plurality of the modules are utilized, and including the further steps of:

applying the positive and negative calibration pressures to the positive and negative calibration ports of all of the modules.

3. Method according to claim 1 wherein a plurality of the modules are utilized, and including the further steps of:

applying the positive and negative calibration pressures to the positive and negative calibration ports of all of the modules; and coupling separate ones of a plurality of high pressure reference sources to the reference source ports of the plurality of modules, respectively.

4. Method for precise measurement of low differential pressures existing between a known high pressure reference source and each of a plurality of unknown high pressure test sources by using a plurality of differential pressure sensors, a reference source port and calibration ports that are all integrated in a scanner module, the method comprising:

utilizing pressure sensors which are each characterized by a sensor component in electrical circuit with a control means, the sensor component being responsive to applied pressure to modulate an electrical signal applied to it by the control means, the magnitude and polarity of the signal changing according to the magnitude of the applied pressure and the side of the sensor component to which the pressure is applied, the reference source port being connected to the known high pressure reference source, and the calibration ports being connected to known calibration pressure sources, respectively;

calibrating the sensors by applying a range of known calibration pressures, including zero (ambient), to opposite sides of the sensor components for obtaining a set of calibration coefficients to compensate for non-linearity, zero offset and pressure sensitivity in the pressure sensors;

coupling one side of the sensor components to the reference source port and the other sides of the sensor components to the test sources, respectively;

establishing a line zero calibration mode by momentarily coupling such other sides of the sensor components to the reference source port to enable the control means to generate a new set of updated calibration coefficients for deriving zero readings upon subsequent recoupling of such other sides of the sensor components to the test sources, respectively; and recoupling such other sides of the sensor components to the test sources, respectively, for utilization of the updated calibration coefficients by the control means to determine the actual differential pressures existing between the reference source and the test sources.

5. Method according to claim 4 wherein a plurality of the modules are utilized, and including the further steps of:

applying the calibration pressures to the calibration ports of all of the modules.

6. Method according to claim 4 wherein a plurality of the modules are utilized, and including the further steps of:

applying the calibration pressures to the calibration ports of all of the modules; and coupling separate ones of a plurality of high pressure reference sources to the reference source ports of the plurality of modules, respectively.

7. Method for precise measurement of low differential pressures existing between a known high pressure reference source and each of a plurality of unknown high pressure test sources by using a plurality of differential pressure sensors, a reference source port and positive and negative calibration ports that are all integrated in a scanner module, the method comprising:

utilizing pressure sensors which are each characterized by a sensor component in electrical circuit with a control means, the sensor component being responsive to applied pressure to modulate an electrical signal applied to it by the control means, the magnitude and polarity of the signal changing according to the magnitude of the applied pressure and the side of the sensor component to which the pressure is applied, the reference source port being connected to the known high pressure reference source, and the positive and negative calibration ports being connected to known positive and negative calibration pressure sources, respectively;

incorporating in the scanner module a first valve means and a second valve means operative, respectively, in a sensor calibration mode, to enable a range of known positive calibration pressures from the positive calibration pressure port to be applied to one side of the sensor components, and to enable a range of known negative calibration pressures from the negative calibration pressure port to be applied to the other sides of the sensor components to derive a set of calibration coefficients to correct for zero offset; the first and second valve means being further operative in a read differential mode to couple the high pressure reference port to one side of each of the sensor components, and to couple the plurality of test sources through the second valve means to the other sides of the sensor components, respectively; the first and second valve means being further operative in a line zero calibration mode to momentarily couple such other sides of the sensor components to the reference source port to derive an updated set of calibration coefficients to correct for zero offset;

operating the first and second valve means to establish the read differential mode;

operating the first and second valve means to establish the line zero calibration mode; and operating the first and second valve means to establish the read differential mode to determine the actual differential pressures existing between the test sources and the reference source.

8. Method according to claim 7 wherein a plurality of the modules are utilized, and including the further steps of:

applying the positive and negative calibration pressures to the positive and negative calibration ports of all of the modules.

9. Method according to claim 7 wherein a plurality of the modules are utilized, and including the further steps of:

applying the positive and negative calibration pressures to the positive and negative calibration ports of all of the modules; and coupling separate ones of a plurality of high pressure reference sources to the reference source ports of the plurality of modules, respectively.

10. Apparatus for precise measurement of low differential pressures existing between a known high pressure reference source and each of a plurality of unknown high pressure test sources, the apparatus comprising:

a scanner module;

a control means;

a plurality of differential pressure sensors incorporated in the module, each of the sensors being characterized by a sensor component in electrical circuit with the control means, the sensor component being responsive to applied pressure to modulate an electrical signal applied to it by the control means, the magnitude and polarity of the signal changing according to the magnitude of the applied pressure and the side of the sensor component to which the pressure is applied;

a reference source port and positive and negative calibration pressure ports incorporated in the scanner, the reference source port being adapted for connection to the known high pressure reference source, and the positive and negative calibration ports being adapted for connection to known positive and negative calibration pressure sources, respectively; and the sensor components being adapted for calibration by connection of the opposite sides of the sensor components to the positive and negative calibration ports, respectively, the control means being adapted during calibration conditions to sense and register the magnitude and polarity of all off-zero electrical signals over the range of the applied calibration pressures for generating and storing a set of calibration coefficients for use by the control means to compensate for zero offset in the pressure sensors under test conditions.

11. Apparatus according to claim 10 wherein a plurality of the modules are utilized, and the positive and negative calibration ports of all of the modules are connected externally of the module to common positive and negative calibration pressure sources, and the reference source ports of all of the modules are connected externally of the module to a common high pressure reference source.

12. Apparatus according to claim 11 wherein a plurality of the modules are utilized, and the positive and negative calibration ports of all of the modules are connected externally of the module to common positive and negative calibration pressure sources, and the reference source ports of all of the modules are connected externally of the modules to separate ones of a plurality of reference source ports.

* * * * *